US012699804B2

(12) United States Patent
Mizrachi et al.

(10) Patent No.: US 12,699,804 B2
(45) Date of Patent: Aug. 4, 2026

(54) DATA COLLABORATION PROTECTION

(71) Applicant: Varonis Systems, Inc., New York, NY (US)

(72) Inventors: Dudi Mizrachi, Herzliya (IL); Hagai Langer, Tel Aviv-Jaffa (IL); Roni Yaari, Herzliya (IL); John Neystadt, Kfar Saba (IL)

(73) Assignee: Varonis Systems, Inc., New York, NY (US)

( * ) Notice: Subject to any disclaimer, the term of this patent is extended or adjusted under 35 U.S.C. 154(b) by 78 days.

(21) Appl. No.: 18/957,082

(22) Filed: Nov. 22, 2024

(65) Prior Publication Data

US 2026/0147916 A1     May 28, 2026

(51) Int. Cl.
*G06F 7/04*        (2006.01)
*G06F 21/62*       (2013.01)
*G06N 20/00*       (2019.01)

(52) U.S. Cl.
CPC ......... *G06F 21/6245* (2013.01); *G06N 20/00* (2019.01)

(58) Field of Classification Search
CPC ...... G06F 21/31; G06F 21/335; G06F 21/604; G06F 21/6245; H04L 63/101; H04L 63/102
See application file for complete search history.

(56) References Cited

U.S. PATENT DOCUMENTS

| | | | |
|---|---|---|---|
| 12,316,647 B1 * | 5/2025 | Pierce, Jr. | ........... H04L 63/1408 |
| 2012/0303558 A1 * | 11/2012 | Jaiswal | ................. G06N 20/00 706/12 |
| 2021/0194888 A1 | 6/2021 | Bhaskar S et al. | |

| | | | |
|---|---|---|---|
| 2021/0342467 A1 | 11/2021 | Levy et al. | |
| 2023/0297713 A1 * | 9/2023 | Serbanati | ............ G06F 21/6227 726/1 |
| 2024/0223726 A1 | 7/2024 | Dotan-Cohen et al. | |
| 2024/0267344 A1 | 8/2024 | Mulligan et al. | |
| 2024/0330502 A1 * | 10/2024 | Zawisza | .................. G06F 21/52 |
| 2024/0330678 A1 * | 10/2024 | Chintalapati | ........ G06N 3/0464 |

(Continued)

OTHER PUBLICATIONS

Veiga et al, A Federated Learning Approach for Continuous User Identification, Oct. 27, 2023, IEEE, pp. 1-6. (Year: 2023).*

(Continued)

*Primary Examiner* — Philip J Chea
*Assistant Examiner* — Jenise E Jackson
(74) *Attorney, Agent, or Firm* — Morgan, Lewis & Bockius LLP

(57)        ABSTRACT

Disclosed is a system and method for automated data collaboration protection of sensitive content across an enterprise computer network. A machine learning model is trained to determine whether users are authorized to view instances of the sensitive content based on a plurality of signals. Responsive to an indication that an instance the sensitive content was shared with a user, the disclose system determines whether the user is authorized to view the instance based on the training of the machine learning model and, only when the model determines that the respective user is authorized to view the sensitive content, allows the instance of sensitive content to be shared with the user, and when the model determines that the respective user was not authorized to view the instance of sensitive content, prevents the instance from being shared with the user.

15 Claims, 4 Drawing Sheets

(56) References Cited

U.S. PATENT DOCUMENTS

2024/0346018 A1    10/2024  Rao et al.
2024/0419837 A1 *  12/2024  Sankaranarayanan .......................
                                                G06F 21/6245

OTHER PUBLICATIONS

Perikos, Sensitive Content Detection in Social Networks Using Deep Learning Models and Explainability Techniques, Jun. 18, 2024, IEEE, pp. 48-53. (Year: 2024).*
International Search Report and Written Opinion in Application No. PCT/US2025/056651 dated Feb. 17, 2026, 13 pages.

* cited by examiner

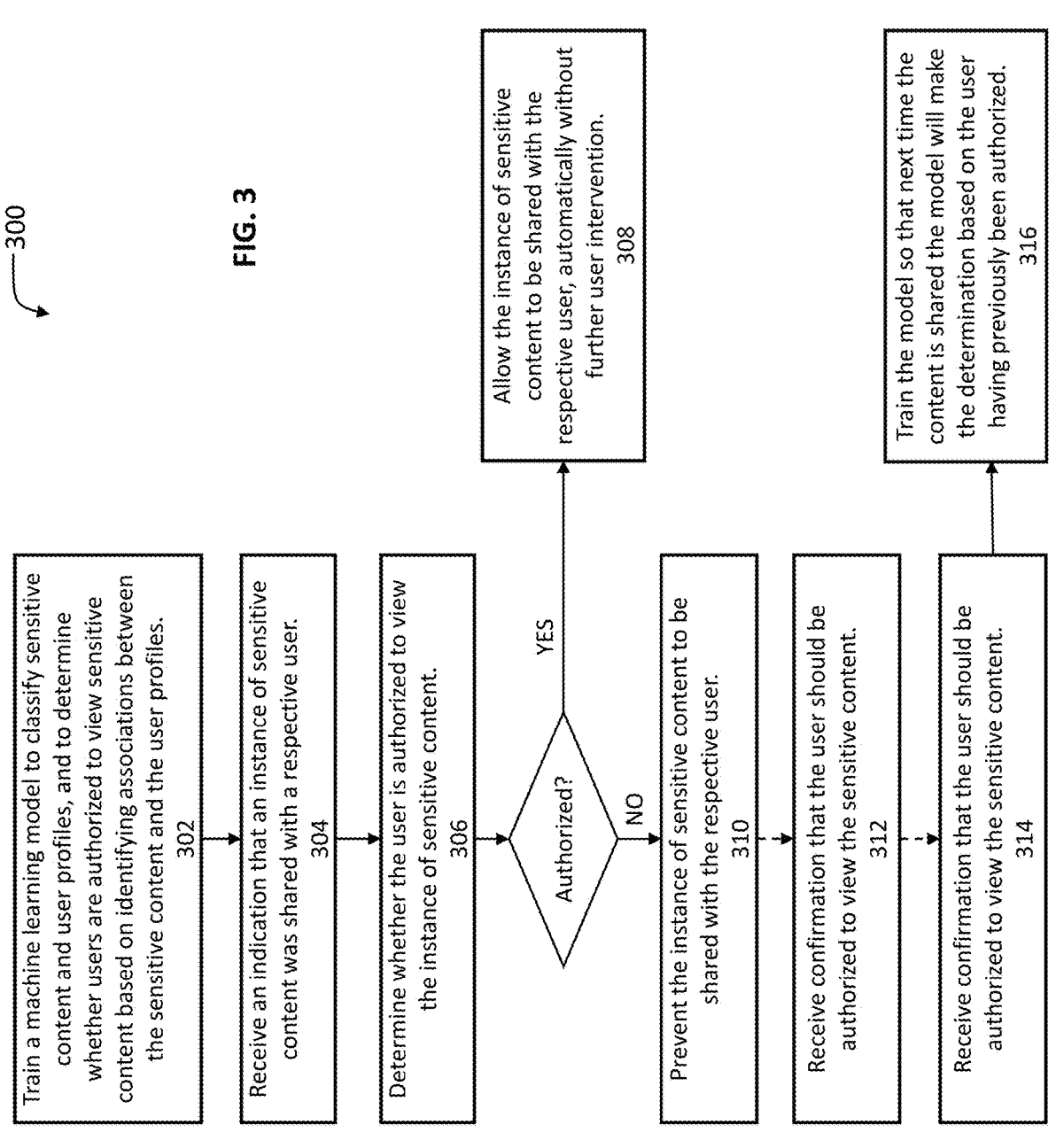

Train a machine learning model to classify sensitive content and user profiles, and to determine whether users are authorized to view sensitive content based on identifying associations between the sensitive content and the user profiles.
302

Receive an indication that an instance of sensitive content was shared with a respective user.
304

Determine whether the user is authorized to view the instance of sensitive content.
306

Authorized?

YES

Allow the instance of sensitive content to be shared with the respective user, automatically without further user intervention.
308

NO

Prevent the instance of sensitive content to be shared with the respective user.
310

Receive confirmation that the user should be authorized to view the sensitive content.
312

Receive confirmation that the user should be authorized to view the sensitive content.
314

Train the model so that next time the content is shared the model will make the determination based on the user having previously been authorized.
316

DATA COLLABORATION PROTECTION

TECHNICAL FIELD

The present invention relates to data loss prevention (DLP) systems, and more specifically, securing sensitive data across various platforms, networks, and devices.

BACKGROUND

As organizations increasingly rely on digital solutions, the risk of data loss or unauthorized exposure of sensitive information continues to grow. DLP systems are essential for monitoring, identifying, and preventing the leakage of sensitive data such as intellectual property, personally iden- tifiable information, and confidential business documents. These systems safeguard information stored on internal servers, transmitted through networks, and accessed on user devices, providing comprehensive protection against inter- nal and external threats.

Collaboration environments like cloud platforms, shared document editing tools, and messaging applications have greatly improved workflow efficiency by enabling real-time communication and file sharing among users across multiple platforms. However, as data moves to and from these platforms, safeguarding proper access control and data pro- tection becomes a significant challenge. Organizations need effective solutions that maintain data security while allowing seamless collaboration.

DLP systems typically operate by applying predefined policies to identify and classify sensitive data based on content analysis, file type, or metadata. These systems can monitor communication channels like email, file transfers, and USB drives to detect unauthorized attempts to share, upload, or download sensitive information. When a potential violation occurs, DLP systems can block the action or quarantine the data according to policies and rules set by the organization. By continuously inspecting data interactions across networks and devices, DLP systems help organiza- tions protect against both accidental and deliberate data breaches, ensuring compliance with security policies and regulations.

SUMMARY

According to various aspects, the subject technology addresses the limitations of existing approaches to data loss protection within collaborative environments by providing a system and method for automated data collaboration pro- tection of sensitive content across an enterprise computer network. Using DLP systems to monitor collaborative envi- ronments can lead to unnecessarily blocked collaborations and false positive alerts that cause delays and redundant checks and processing cycles. Moreover, the increased net- work traffic required to request and reprocess blocked actions can lead to unnecessary strain on the enterprise systems.

The disclosed system solves such problems of by provid- ing a security system that promotes the collaboration of sensitive data wherever participants in the collaboration should be allowed to collaborate, despite conventional data loss protection policies that may be in place. The subject technology employs machine learning to take advantage of each collaborator's dynamic identity as well as their actual runtime knowledge of sensitive data to determine whether existing rules regarding the sharing of information can be bypassed or overridden.

In particular, a method according to subject technology comprises training a machine learning model to classify sensitive content and user profiles of users accessing a computer network, and to determine whether users are authorized to view instances of the sensitive content based on identifying associations between the sensitive content and the user profiles; receiving an indication that an instance of sensitive content was shared with a respective user; responsive to the indication that the instance the sensitive content was shared with the respective user: determining, by the machine learning model, whether the respective user is authorized to view the instance of sensitive content based on the training of the machine learning model and the machine learning model identifying one ore more associations between the instance of sensitive content and the user profile of the respective user; only when the machine learning model determines that the respective user is authorized to view the sensitive content, allowing the instance of sensitive content to be shared with the respective user, automatically without further user intervention; and when the machine learning model determines that the respective user was not authorized to view the instance of sensitive content, pre- venting the instance of sensitive content to be shared with the respective user. Other aspects include corresponding systems, apparatus, and computer program products for implementation of the corresponding method and its fea- tures.

By automating DLP determinations based on machine learning, false positive DLP alerts and unnecessarily blocked collaborations can be avoided or at least substan- tially reduced. Moreover, by intelligently bypassing conven- tional DLP mechanisms, by way of automatically determin- ing whether to unblock the sharing of data that would otherwise be blocked by fixed rules increases efficiency in an organization's network traffic and computer memory by reducing unnecessary interruptions and data handling, in addition to enabling the responsible sharing of data. Instead of rigidly applying rules that might block legitimate data- sharing activities, the disclosed system adapts in real-time to allow permitted transactions to proceed without delays, reducing the number of redundant checks and processing cycles. Accordingly, the amount of network traffic required to request and reprocess blocked actions is minimized, freeing up bandwidth for other tasks. Additionally, dynami- cally assessing data access needs can optimize memory usage by reducing the amount of stored data on blocked requests or error handling logs, which would otherwise accumulate in a fixed-rule system. The overall effect is a more streamlined flow of information and better resource management across the network.

It is understood that other configurations of the subject technology will become readily apparent to those skilled in the art from the following detailed description, wherein various configurations of the subject technology are shown and described by way of illustration. As will be realized, the subject technology is capable of other and different configu- rations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

For a better understanding of the various described imple- mentations, reference should be made to the Description of Implementations below, in conjunction with the following drawings. Like reference numerals refer to corresponding parts throughout the figures and description.

FIG. 3 depicts an example process flow diagram for automated data collaboration protection of sensitive content across an enterprise computer network, according to aspects of the subject technology.

DESCRIPTION

Figure 1:
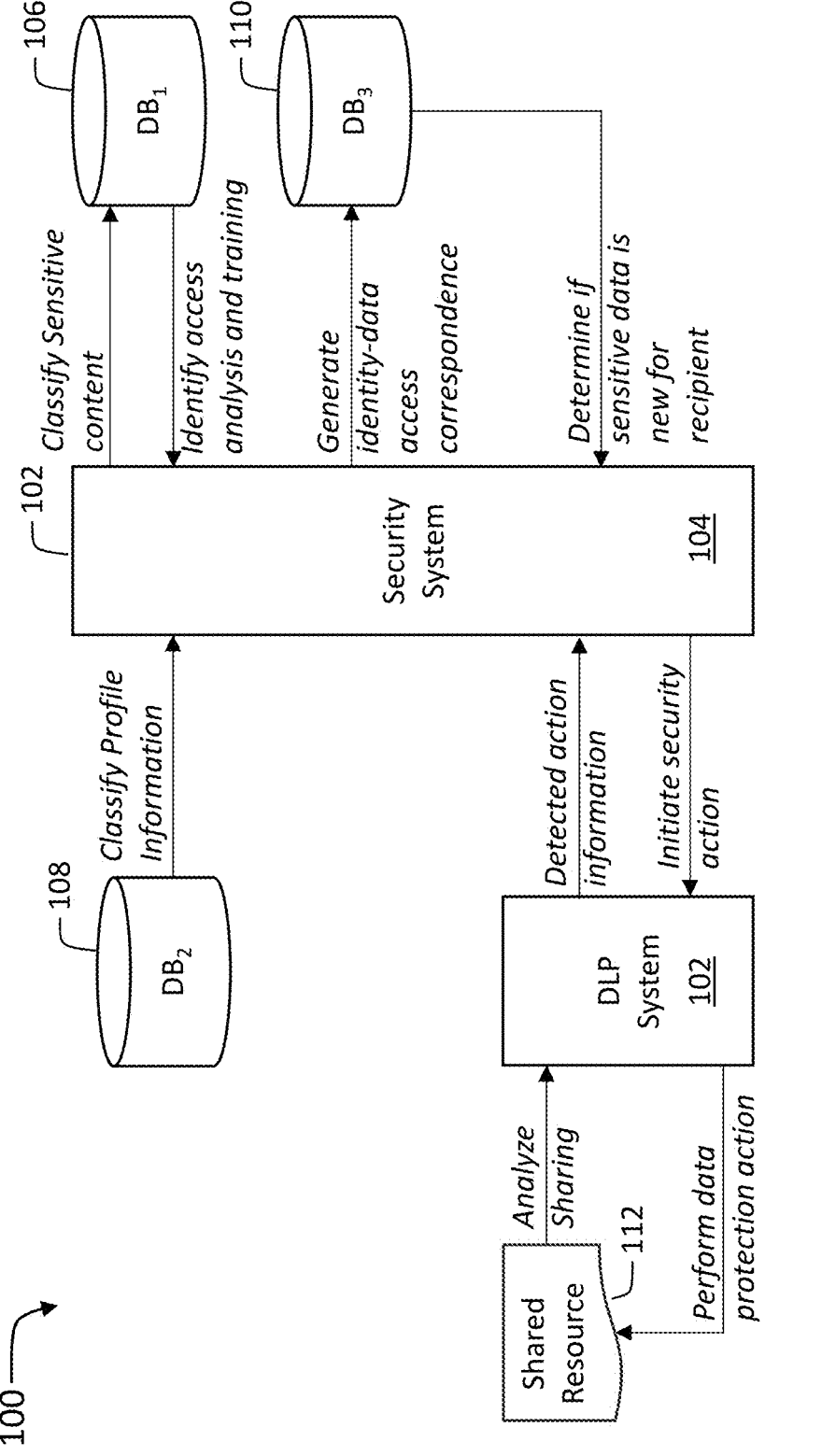
FIG. 1 depicts a block diagram of an example enterprise data security system for automated data collaboration protection of sensitive content across an enterprise computer network, according to aspects of the subject technology.

Reference will now be made to implementations, examples of which are illustrated in the accompanying drawings. In the following description, numerous specific details are set forth in order to provide an understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

Modern organizations face the problem of how to automatically determine whether a collaboration taking place within or between organizations and other entities (e.g., by email or chat, virtual meeting, and other online collaborations) includes sensitive data, and whether normal data loss protection measures with respect to that data should be automatically overridden or bypassed without human intervention, allowing individuals to collaborate seamlessly and without interruption.

Conventional DLP systems often include classification engines that analyze a document when it is opened, edited, or shared by a user to detect sensitive data. Once sensitive data is identified, the system sends this information to a policy engine, which is specifically designed to protect such data. The policy engine evaluates the presence of sensitive data in the document against predefined data protection rules to determine whether it is exposed to unauthorized access or handling. If a violation is detected, the policy engine enforces security measures by restricting access to the document and notifying the user of the sensitive data's protection status. Only authorized individuals, such as the document's creator or designated administrators, can continue accessing the sensitive information. Furthermore, conventional DLP systems are often not fully integrated with collaboration tools, limiting their ability to protect sensitive data in real-time collaboration scenarios.

Moreover, conventional DLP systems and tools often fall short for alerting or blocking legitimate documents that may be the subject of collaboration. For example, sending sensitive data over email, chat or other collaboration tools frequently generates false positive DLP alerts. One type of false positive often occurs when all the collaborators already have access to the sensitive data being shared. In that case, also although the data is indeed sensitive, it is not new to any of the collaborators, and the collaboration does create any overexposure.

Due to this problem, many collaborations are unnecessarily blocked, and the collaboration over sensitive data is disturbed, which may have a negative impact on the business or lead the organization to give up on DLP altogether. The disclosed system solves these problems by intelligently automating data collaboration protection of sensitive content across the organization's computer network. A machine learning model is trained to determine whether content being shared between users is indeed sensitive to the organization and whether each user should be allowed to share and/or receive the content based on multiple signals, including whether associations can be identified between the sensitive content and user profiles of those users. In this manner, the system can allow the sharing of the content when the sharing should be allowed irrespective of fixed policies and rules.

FIG. 1 depicts a block diagram of an example enterprise data security system 100 for automated data collaboration protection of sensitive content across an enterprise computer network, according to aspects of the subject technology. The disclosed enterprise data security system 100 integrates the functionality of a proprietary and/or modified data loss prevention (DLP) system 102 with the functionality of a proprietary collaboration security system 104 to provide enhanced protection and control over access to sensitive data shared within collaborative environments such as in online chats, virtual meetings, email, and other digital collaborations occurring internally or extending across organizational boundaries. While DLP system 102 and collaboration security system 104 and their relevant functions are described separately herein, the functionality of both systems may be incorporated into a single system or server(s). In this regard, the systems may co-exist on the same servers and/or share one or more data sources and machine learning models. For example, according to some implementations, a single machine learning model may be used to perform analysis and make decisions for both systems.

The disclosed collaboration security system 104 is configured to augment the functionality of the disclosed DLP system 102 and, in some implementations, supplement or replace policy rules of the DLP system. The collaboration security system 104, using artificial intelligence (AI) and machine learning to inform its decision-making, is configured to, automatically without user intervention, determine whether a collaboration initiated within a computer network (e.g., a file shared in an online chat, virtual meeting, email, and other online collaboration) includes sensitive data and determine who is authorized to access that data, without reference to traditional roles or access privileges.

In the depicted example, one or more content data sources 106 (e.g., a first database, file server, or the like) maintain sensitive content that is catalogued and/or stored by or for the security system 104 analyzes, while one or more identity data sources 108 (e.g., second databases, file systems, identity servers, and the like) contain user profile data for users of the organization. One or more access correspondence data sources 110 (e.g., a third database, file server, or the like) serves as a repository for training data and access criteria and decision-making correspondence generated during real time analysis of collaborations and the sensitive content that may be identified therein.

The DLP system 102 monitors and accesses attempts to access sensitive content within online chats, virtual meetings, email systems, and other online collaborations, scanning user actions, file transfers, and network activity. Upon detecting an access attempt, the DLP system 102 communicates the details of the event to the collaboration security system 104, which manages the evaluation of whether access should be allowed. The collaboration security system 104 maintains a real-time mapping between the identities within identity data sources 108 and all the sensitive records it can access from content data sources 106. As will be described further, the security system 104 may discover and classify all of the organization's data and, for each identity, personal, service, managed identity and the like (e.g., within the identity data source(s) 108), store a list of sensitive records (e.g., within the access correspondence data source(s) 110) that it has access to. In some implementations, the machine learning model may classify sensitive content (e.g., identified in content data source(s) 106) and user profiles of users accessing the organization's computer network (e.g., from identity data source(s) 108), and store the classifications and other training data in the access correspondence data sources 110 for use in determining, at runtime, whether a piece of content shared between users should be deemed sensitive content and whether that sensitive content should be made available to the users between which it is shared.

When a resource 112 (e.g., a document or message) is shared between users, the data security system 100 identifies sensitive content in the resource (e.g., within the document or message) and verifies that the users are authorized to share the sensitive content. For example, the system 100 may verify that the sender is authorized to share the content and, for each recipient, check if the sensitive content is new to them based on the real-time mapping, training data and other access information in the access correspondence data sources 110.

In some implementations, when a resource 112 is shared, the DLP system analyzes the resource 112 to detect whether the resource 112 includes sensitive content and, if so, determines a data protection action to apply to the resource (e.g., to block the sharing of the content between the users). It then sends the identified sensitive content and an identification of the recipient(s) and the sender (and in some implementations, an identification of the action) to the security system 104, which determines whether each user is authorized to view the content based on one or more signals. For example, a user may be authorized to view the content based on identifying whether the respective user previously viewed the sensitive content and a second signal comprising identifying the one or more associations between the instance of sensitive content and the user profile of the respective user. Different protection measures may then be applied to each user. For example, the collaboration security system 104 may instruct the DLP system to carry out the data protection action or to perform a different action. Different measures can be applied, including issuing an alert, blocking the message, alerting an administrator, allowing the sender to sanitize the message, warn the sender, remove or anonymize the sensitive information within the message, send a notice to the sender or other designated individual to approve the sharing, and the like.

According to some implementations, the collaboration security system 104 processes information received from the DLP system 102 and retrieves any necessary data from the access correspondence data source(s) 110 and performs a comprehensive analysis to determine whether the sharing should be allowed or prevented. This analysis takes into account various factors, including the type of data, the user attempting to access it, and any contextual elements that might influence the decision. In some implementations, one signal includes whether a semantic similarity can be identified between a classification of the sensitive content and a classification of the respective user profile of the recipient. In this regard, the collaboration security system 104 may generate embeddings for the content classification and for the profile classification using a language model, wherein the embeddings represent and/or capture a semantic meaning of the content classification and profile classifications. At runtime, the system 104 may determine a semantic similarity between the content classification and a profile classification of the user profile of the respective user by comparing the embeddings. Identifying such a similarity may indicate a strong signal that access should be granted.

Another signal may include identifying whether the respective user previously viewed the sensitive content. Consideration of prior access can be, for example, based on a predetermined window of time (in the past) and/or the number of times that it was accessed, and/or whether peers have accessed the same content. The signals applied by the system may be weighted. For example, the recipient accessing the sensitive data within a previous window of time, temporal to the current access (e.g., within the last week), could be weighted more strongly than who of the other members in the recipient's team accessed it, for example, on the same day, or whether there is a semantic similarity between the profile and content classifications, as determined by the language model.

Once the analysis is complete, the collaboration security system 104 communicates back to the DLP system 102, providing instructions on whether to grant, restrict, or deny access to the data resource. In implementations wherein the collaboration security system 104 received an indication of the data protection action to be performed by the DLP system 102, the collaboration security system 104 may allow or override the action, or change the action. The DLP system 102 then proceeds to enforce the required action.

The overall operation of the system relies on the seamless integration of these components. The disclosed DLP system 102 performs a traditional role of detecting data interactions, in addition to providing novel communication and integration with the disclosed collaboration security system 104. According to various implementations, while the collaboration security system 104 supplements or replaces traditional role based and/or policy driven decisions by providing enhanced, context-sensitive decision-making based on machine learning. This integration allows for more granular control over data access and ensures that sensitive information is protected based on real-time assessments rather than static rules alone. The system 104 dynamically adjusts access permissions based on evolving data and user contexts, offering a flexible and robust solution for enterprise data security.

Figure 2:
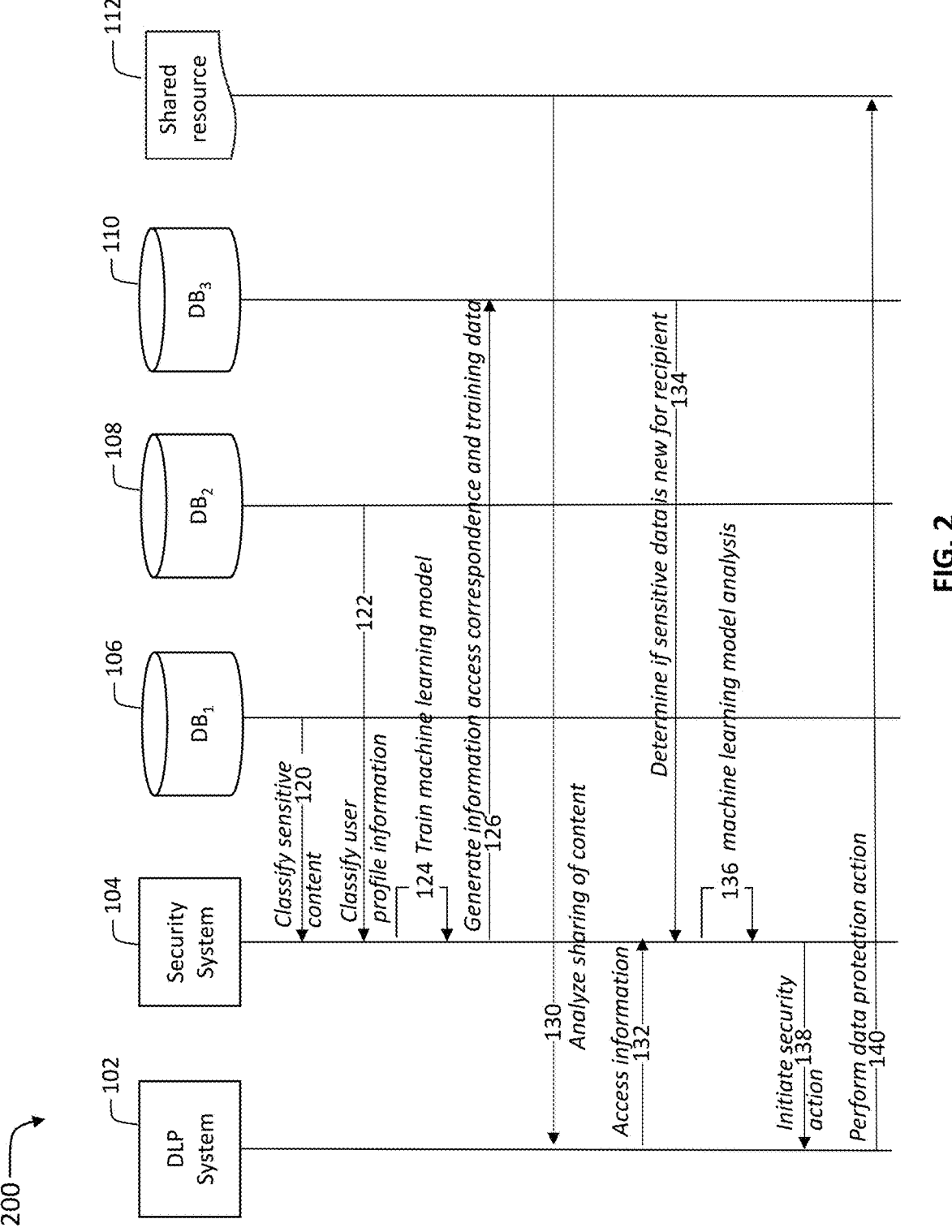
FIG. 2 depicts a sequence diagram of an example process for automated data collaboration protection of sensitive content across an enterprise computer network, according to aspects of the subject technology.

FIG. 2 depicts a sequence diagram of an example process 200 for automated data collaboration protection of sensitive content across an enterprise computer network, according to aspects of the subject technology. In the depicted example, interactions within enterprise data security system 100 are conducted between the disclosed DLP system 102, the disclosed collaboration security system 104, the disclosed identity data source(s) 106, the disclosed identity data source(s) 108, the disclosed access correspondence data source(s) 110, and a shared resource 112. As described previously, in some implementations, the functionality of the DLP system 102 and collaboration security system 104 may be provided by a single system and/or the same server(s).

A machine learning model is trained by applying classification models to sensitive content and user profiles of users that access an organization's computer network. The classification of the content and profile are later used at runtime by the machine learning model to determine whether a particular recipient of sensitive content should have authorization to view the sensitive content.

Accordingly, in the depicted example, the collaboration security system 104 accesses (120) sensitive content from the content source(s) 106. This content may include sensitive data or metadata or context-specific information that requires classification and evaluation. In some implementations, content source(s) 106 is representative of all centrally stored content of the organization (e.g., a document management system). In some implementations, content source(s) 106 represents content within the organization that is identified as being sensitive (e.g., by way of training the disclosed machine learning model). Simultaneously or in connection with accessing the sensitive content, the collaboration security system 104 retrieves (122) profile information from the identity data source(s) 108, which includes information about the users of the organization's computer network.

Once the collaboration security system 104 has retrieved the necessary data from both databases, it performs an internal analysis and trains the machine learning model (124). The machine learning model is trained to classify sensitive content and user profiles of users accessing a computer network, and to determine whether users are authorized to view instances of the sensitive content based identifying associations between the sensitive content and the user profiles. Accordingly, the training may include classifying the sensitive content using a machine learning model to generate a content classification, classifying the user profiles using the machine learning model to generate profile classifications, and generating embeddings for the content classification and the profile classification using a language model. In some implementations, the embeddings represent a semantic meaning of the content classification and profile classifications. In this regard, the system is trained to determine (at runtime) a semantic similarity between the content classification and a profile classification of the user profile of the respective user by comparing the embeddings.

As part of the training, the machine learning model may evaluate the sensitivity of the content, assesses risk levels, and processes metadata to generate insights. After the training is complete, the security system 104 may generate a general correspondence between the data it processed and any rules or policies that govern access to this data. This correspondence may then be stored in the disclosed access correspondence data source(s) 110 (126), where it remains available for future reference during runtime. This data source may act as a repository for decision-making criteria that will be consulted later to determine whether access to the data should be allowed or restricted.

At runtime, the disclosed DLP system 102 detects the sharing of a resource 112 and analyzes (130) the shared resource 112 to identify an instance of sensitive content was shared. In this regard, the disclosed DLP system 102 is configured to continuously monitor data interactions within the organization. Such interactions can include attempts to transfer files, access documents, or share sensitive information via email or other channels. The DLP system analyzes these actions in real-time to identify whether they include sensitive content. For example, the DLP system 102 may compare content in the shared resource 112 with known content in content data source(s) 106. Additionally or in the alternative, in some implementations, a machine learning model is trained to understand what content is sensitive content for a particular organization. For example, machine learning models can be trained to recognize sensitive content by using large labeled datasets. In this regard, the model learns patterns and features associated with different types of content and the model is validated on new data to ensure it can accurately classify or identify similar content it hasn't seen before.

Conventional DLP systems typically incorporate policy engines to guide decisions and enforce rules based on the sensitivity of data and a user's access privileges. However, the disclosed DLP system may not rely on a standard policy engine. Instead of the DLP system 102 blocking detected sensitive content, the DLP system 102 sends (132) details about the detected sharing attempt to the collaboration security system 104, which performs an analysis based on machine learning to determine whether the sharing of the content should be allowed.

The sensitive content (e.g., the specific instance of the sensitive content) detected by the DLP system 102 is sent to the collaboration security system 104 along with an identification of the user or users who are designated to receive the sensitive content as part of a sharing action. Upon receiving this information, the collaboration security system 104 retrieves relevant correspondence from the access correspondence data source(s) 110, which was previously stored following the initial analysis and performs an analysis based on machine learning principles to determine whether the respective user is authorized to view the instance of sensitive content. The access correspondence data source(s) 110 stores information about what all users in the organization have accessed or seen and, contextually, what each user has knowledge of.

According to various implementations, the determination of whether the sharing of the content should be allowed is based on a plurality of signals that are weighted by the machine learning model. These signals may include, for example, whether the particular instance of sensitive content being shared was accessed by the same user before, whether a group that the user is associated with can be semantically associating with access to a classification of sensitive content associated with the shared instance, and whether peers of the user have access to the content. Regarding semantic association, the collaboration security system 104 may determine that a name of s group (e.g., department, title or position) associated with the user is semantically associated with access to certain classifications of the sensitive content. That is, the system may match a data classification (e.g., tag or label) for the content (e.g., resume, financial report, contract) with a user classification of the user, using textual mechanisms (e.g., not role-based). This can be accomplished, for example, using embeddings in language models.

Once the collaboration security system 104 completes its analysis, it instructs (138) the DLP system 102 on the appropriate course of action. Depending on the outcome of the analysis, the DLP system 102 may enforce various data protection measures. These measures could include, for example, blocking the access attempt entirely, allowing partial access with restricted permissions, encrypting the data before it is accessed, triggering an alert to system administrators, or removing permissions that are not being used. In some implementations, the system can also remove unused access permissions from existing role-based models. For example, in a team of five within an accounting department, if only one member has accessed sensitive content and their access is infrequent, it may be removed. However, the system may retain access for that individual if other team members have recently and consistently accessed the same content.

The DLP system 102 acts, automatically and without further user intervention, based on the instructions provided by the collaboration security system 104, ensuring that authorized users can access the data resource under the appropriate conditions. In this way, the proprietary security system enhances the conventional DLP system's capabilities, adding a more dynamic and context-aware layer of decision-making that is not solely reliant on static policy rules.

FIG. 3 depicts an example process flow diagram for automated data collaboration protection of sensitive content across an enterprise computer network, according to aspects of the subject technology. For explanatory purposes, the various blocks of example process 300 are described herein with reference to FIGS. 1 and 2, and the components and/or processes described herein. One or more of the blocks of process 300 may be implemented, for example, by one or more servers or computing devices, such as security manager server(s) 114. In some implementations, one or more of the blocks may be implemented apart from other blocks, and by one or more different processors (including virtual processors) or devices. Further for explanatory purposes, the blocks of example process 300 are described as occurring in serial, or linearly. However, multiple blocks of example process 300 may occur in parallel. In addition, the blocks of example process 300 need not be performed in the order shown and/or one or more of the blocks of example process 300 need not be performed.

In the depicted example, a machine learning model is trained (302) to classify sensitive content and user profiles of users accessing a computer network, and to determine whether users are authorized to view instances of the sensitive content based on identifying associations between the sensitive content and the user profiles. According to various implementations, classifying the sensitive content and user profiles may include classifying the sensitive content using the machine learning model to generate a content classification, classifying the user profiles using the machine learning model to generate profile classifications, and generating embeddings for the content classification and the profile classification using a language model, wherein the embeddings represent a semantic meaning of the content classification and profile classifications. These embeddings may be stored in the access correspondence data source(s) 110. In this regard, the machine learning model is trained to determine a semantic similarity between the content classification and a profile classification of the user profile of the respective user by comparing the embeddings at runtime.

In some implementations, the machine learning model is further trained to determine whether a user is authorized to view an instance of sensitive content based on a plurality of signals. A first signal may include identifying whether the respective user previously viewed the instance of sensitive content, and a second signal may include identifying the one or more associations between the instance of sensitive content and the user profile of the respective user. A third signal of the plurality of signals may include identifying a semantic association between a name of a group that the user is associated with and access to a classification of the sensitive content. A fourth signal of the plurality of signals may include identifying peers of the user that have access to the instance of sensitive content.

The system receives (304) an indication that an instance of sensitive content was shared with a respective user. In this example, content is shared as part of a collaboration. For the purpose of this disclosure, a collaboration includes the sharing of data (e.g., messages, files, documents, or other information) within online chats, virtual meetings, emails, and other digital and online collaborations. In this regard, the disclosed DLP system continuously monitors and protects an organization's data by scanning and analyzing all sharing interactions in real time. This includes scanning documents and messages that users attempt to access, copy, share, send via email, or transfer within an online chat or virtual meeting (as well as monitoring network traffic, file transfers, and external storage use associated with the organization). According to various implementations, this scanning occurs when a message or document or other information within a message, is shared via a collaboration tool such as within a chat, virtual meeting, email, and the like. The system identifies sensitive content such as personally identifiable information (PII), financial data, or intellectual property based on predefined policies or content classification rules. When the disclosed DLP system detects an action that violates security policies, such as potential unauthorized access, sharing, or transmission of sensitive data, it can initiate steps to block the action, alert administrators, or apply additional protection measures like encryption. According to various implementations, this initiation of steps to block the action includes handing off control of the blocking action to the disclosed collaboration security system 104.

In some implementations, the disclosed DLP system 102 employs a machine learning model (e.g., a large language model) is trained to recognize instances of sensitive content by being exposed to a large dataset that includes examples of the content it needs to identify. During training, the model learns patterns, structures, and context from the data, allowing it to associate specific words, phrases, or features with different content types. For instance, it might be trained to recognize legal documents, personal information, or technical articles by analyzing labeled examples of each. Through this process, the model refines its ability to classify new, unseen instances of sensitive content based on the learned characteristics. In this regard, the DLP system may identify when a document is shared between two or more of the users and pass the document to the large language model to identify the sensitive content, and the machine learning model may provide an indication that an instance of sensitive content is being shared between the users.

Responsive to the indication that the instance the sensitive content was shared with the respective user, the disclosed collaboration security system 104—which employs a machine learning model—determines (306) whether the respective user is authorized to view the instance of sensitive content. This determination is based on the previously described training of the machine learning model, for example, on the plurality of signals.

For the purpose of this disclosure, the DLP system and the collaboration security system are discussed separately. However, these systems may be integrated to a single system and/or exist on the same group of server(s). These systems may employ the same machine learning model to accomplish both tasks. In some implementations, the machine learning model accomplishes both tasks simultaneously. For example, the machine learning model may identify when a document is shared between two or more of the users and determine whether the respective user is authorized to view the sensitive content.

The plurality of signals used to determine whether the user is authorized to view the instance of sensitive content may include, for example, identifying whether the respective user previously viewed the instance of sensitive content, identifying the one or more associations between the instance of sensitive content and the user profile of the respective user, identifying a semantic association between a name of a group that the user is associated with and access to a classification of the sensitive content, and identifying peers of the user that have access to the instance of sensitive content. These signals may be automatically weighted by the machine learning model, according to its training. For example, a greater weight may be assigned to the respective user being previously authorized to view the sensitive content commensurate with how many times the respective user was previously confirmed to be authorized to view the instance of sensitive content. A lesser weight may, for example, be assigned to the identification of peers (e.g., in a same group with the user) who have access to the same instance of sensitive content. In some implementations, the instance of sensitive content may be identified as having been authorized for viewing by other users in the same group with the respective user within a predetermined period of time. The strength of this signal may be determined, for example, based on the number or percentage of users within the group that have access to the content and the temporal relationship between their access and the current sharing of the content with the respective user who is to potentially receive the content.

As described previously, the machine learning model may identify one or more associations between the instance of sensitive content and the user profile of the respective user. In some implementations, the machine learning model may associate the detected instance of sensitive content with the user profile of the respective user based on determining a semantic similarity between embeddings for a content classification of the sensitive content and a profile classification of the user profile. In some implementations, associating the instance of sensitive content with the user profile of the respective user based on the determined semantic similarity comprises identifying that a department, title or position associated with the respective user is associated with access to certain classifications of the sensitive content. For example, the name of the department, title or position of the user may be correlated by the machine learning model with access to the type of sensitive content to which the instance of sensitive content belongs.

When the machine learning model determines that the respective user is authorized to view the sensitive content, the system allows (308) the instance of sensitive content to be shared with the respective user, automatically without further user intervention. In this regard, the collaboration security system 104 may automatically override or bypass an action to be performed by the DLP system 102 with regard to the sharing of the instance of sensitive content. As described previously, collaboration security system 104 may instruct (138) the DLP system 102 on the appropriate course of action. Accordingly, the sharing action is allowed to proceed without any impediment by the DLP system (e.g., as if the DLP did not exist), even though the content may have been appropriately identified as sensitive content and would have otherwise been blocked by existing policies or rules.

When the machine learning model determines that the respective user was not authorized to view the instance of sensitive content, the system prevents (310) the instance of sensitive content to be shared with the respective user. In this regard, the collaboration security system 104 may allow the data loss protection system to perform normal operations with regard to the sharing of the instance of sensitive content. For example, the collaboration security system 104 may choose to not interfere with the normal operation of the DLP, or may affirmatively acknowledge that the DLP system may proceed with a data protection action.

In some implementations (optionally, in the depicted example), when the respective user is not authorized to view the instance of sensitive content, the data security system 100 automatically flags the respective user for future authorization to the instance of sensitive content (312). In this regard, a message may be sent to an administrator or designated team lead in a group associated with the user to inform that person that the user recipient was denied access to the content and the circumstances of the detecting sharing. The administrator or team lead may then confirm that the user should have access to the content or confirm that the user should not receive access.

In the depicted example, after the respective user is flagged for future authorization to the instance of sensitive content, the system optionally receives (314) a confirmation that the respective user should be authorized to view the instance of sensitive content. The machine learning model is then further trained (316) so that a next time that the sensitive content is shared with the respective user the machine learning model will determine whether the respective user is authorized to view the instance of the sensitive content based in part on the respective user being previously authorized to view the sensitive content.

Many of the above-described example steps of process 300, and related features and applications, may also be implemented as software processes that are specified as a set of instructions recorded on a computer readable storage medium (also referred to as computer readable medium), and may be executed automatically (e.g., without user intervention). Any or all of the foregoing steps may be performed by a machine, automatically. That is, the step(s) may be performed without user involvement or action, for example, according to a predetermined programmed schedule or in response to a preceding action. When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

The term "software" is meant to include, where appropriate, firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
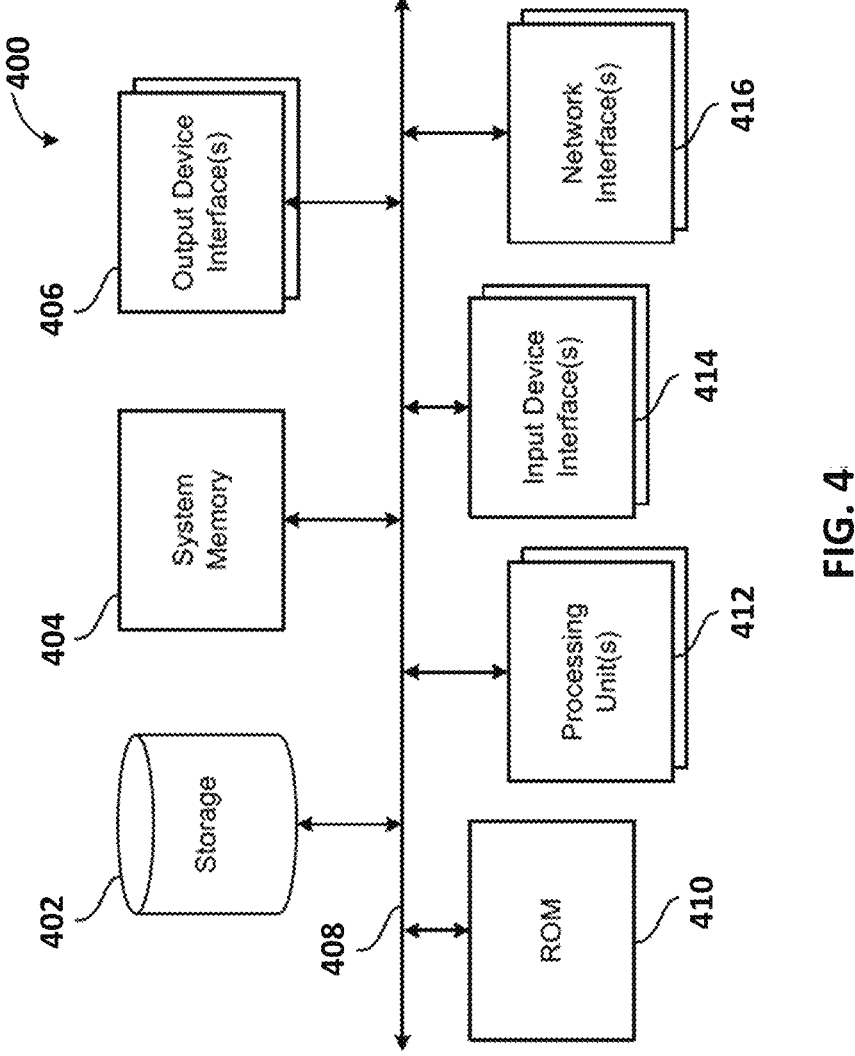
FIG. 4 is a conceptual diagram illustrating an example electronic system for automated data collaboration protection of sensitive content across an enterprise computer network, according to aspects of the subject technology.

FIG. 4 is a conceptual diagram illustrating an example electronic system for automated data collaboration protection of sensitive content across an enterprise computer network, according to aspects of the subject technology. Electronic system 400 may be a specifically configured computing device for execution of software associated with one or more portions or steps of process 400, or components and processes provided by FIGS. 1 through 3, including but not limited to a user endpoint device 112, internal server 110, edge device 106, or external application server 113. Electronic system 400 may be or include a server, a personal computer or a mobile device such as a smartphone, tablet computer, laptop, PDA, an augmented reality device, a wearable such as a watch or band or glasses, or combination thereof, or other touch screen or television with one or more processors embedded therein or coupled thereto, or any other sort of computer-related electronic device having network connectivity.

Electronic system 400 may include various types of computer readable media and interfaces for various other types of computer readable media. In the depicted example, electronic system 400 includes a bus 408, processing unit(s) 412, a system memory 404, a read-only memory (ROM) 410, a permanent storage device 402, an input device interface 414, an output device interface 406, and one or more network interfaces 416. In some implementations, electronic system 400 may include or be integrated with other computing devices or circuitry for operation of the various components and processes previously described.

Bus 408 collectively represents all system, peripheral, and chipset buses that communicatively connect the numerous internal devices of electronic system 400. For instance, bus 408 communicatively connects processing unit(s) 412 with ROM 410, system memory 404, and permanent storage device 402.

From these various memory units, processing unit(s) 412 retrieves instructions to execute and data to process, in order to execute the processes of the subject disclosure. The processing unit(s) can be a single processor or a multi-core processor in different implementations.

ROM 410 stores static data and instructions that are needed by processing unit(s) 412 and other modules of the electronic system. Permanent storage device 402, on the other hand, is a read-and-write memory device. This device is a non-volatile memory unit that stores instructions and data even when electronic system 400 is off. Some implementations of the subject disclosure use a mass-storage device (such as a magnetic or optical disk and its corresponding disk drive) as permanent storage device 402.

Other implementations use a removable storage device (such as a floppy disk, flash drive, and its corresponding disk drive) as permanent storage device 402. Like permanent storage device 402, system memory 404 is a read-and-write memory device. However, unlike storage device 402, system memory 404 is a volatile read-and-write memory, such as a random access memory. System memory 404 stores some of the instructions and data that the processor needs at runtime. In some implementations, the processes of the subject disclosure are stored in system memory 404, permanent storage device 402, and/or ROM 410. From these various memory units, processing unit(s) 412 retrieves instructions to execute and data to process in order to execute the processes of some implementations.

Bus 408 also connects to input and output device interfaces 414 and 406. Input device interface 414 enables the user to communicate information and select commands to the electronic system. Input devices used with input device interface 414 include, e.g., alphanumeric keyboards and pointing devices (also called "cursor control devices"). Output device interfaces 406 enables, e.g., the display of images generated by the electronic system 400. Output devices used with output device interface 406 include, e.g., printers and display devices, such as cathode ray tubes (CRT) or liquid crystal displays (LCD). Some implementations include devices such as a touchscreen that functions as both input and output devices.

Also, as shown in FIG. 4, bus 408 also couples electronic system 400 to a network (not shown) through network interfaces 416. Network interfaces 416 may include, e.g., a wireless access point (e.g., Bluetooth or WiFi) or radio circuitry for connecting to a wireless access point. Network interfaces 416 may also include hardware (e.g., Ethernet hardware) for connecting the computer to a part of a network of computers such as a local area network ("LAN"), a wide area network ("WAN"), wireless LAN, or an Intranet, or a network of networks, such as the Internet. Any or all components of electronic system 400 can be used in conjunction with the subject disclosure.

Each network connections disclosed herein may be a wired or wireless connection, such as by Ethernet, WiFi, BLUETOOTH, an integrated services digital network (ISDN) connection, a digital subscriber line (DSL) modem, or a cable modem. Direct or indirect network connection may be used, including, but not limited to a telephone modem, an MIB system, an RS232 interface, an auxiliary interface, an optical link, an infrared link, a radio frequency link, a microwave link, a personal area network connection, a local area network connection, a cellular link, or a WLANS connection or other wireless connection.

Enterprise devices incorporating aspects of the subject technology may be equipped with a network interface module (NIM), allowing each device to participate as a node in a network. While for purposes of clarity the subject technology will be described as operating in an Ethernet network environment using the Internet Protocol (IP), it is understood that concepts of the subject technology are equally applicable in other network environments, and such environments are intended to be within the scope of the subject technology.

Data to and from the various data sources can be converted into network-compatible data with existing technology, and movement of the information between the appliances and the network can be accomplished by a variety of means. For example, the appliances and network may communicate via automated interaction, manual interaction, or a combination of both automated and manual interaction. Automated interaction may be continuous or intermittent and may occur through direct network connection, or through RS232 links, MIB systems, RF links such as BLUETOOTH, IR links, PANS, LANS, WLANS, digital cable systems, telephone modems or other wired or wireless communication means. The communication means in various aspects may be bidirectional with access to data from as many points of the distributed data sources as possible. Decision-making can occur at a variety of places within the network.

These functions described above can be implemented in computer software, firmware, or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to specifically configured electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and may interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

Illustration of Subject Technology as Clauses

Various examples of aspects of the disclosure are described as numbered clauses (1, 2, 3, etc.) for convenience. These are provided as examples, and do not limit the subject technology.

Identifications of the figures and reference numbers are provided below merely as examples and for illustrative purposes, and the clauses are not limited by those identification.

Clause 1. A machine-implemented method of protection data in a data collaboration environment, comprising: training a machine learning model to classify sensitive content and user profiles of users accessing a computer network, and to determine whether users are authorized to view instances of the sensitive content based on identifying associations between the sensitive content and the user profiles; receiving an indication that an instance of sensitive content was shared with a respective user; responsive to the indication that the instance the sensitive content was shared with the respective user: determining, by the machine learning model, whether the respective user is authorized to view the instance of sensitive content based on the training of the machine learning model and the machine learning model identifying one ore more associations between the instance of sensitive content and the user profile of the respective user; only when the machine learning model determines that the respective user is authorized to view the sensitive content, allowing the instance of sensitive content to be shared with the respective user, automatically without further user intervention; and when the machine learning model determines that the respective user was not authorized to view the instance of sensitive content, preventing the instance of sensitive content to be shared with the respective user.

Clause 2. The machine-implemented method of Clause 1, wherein the method further comprises, after allowing the instance of sensitive content to be shared with the respective user: flagging the respective user for future authorization to the instance of sensitive content; receiving a confirmation that the respective user should be authorized to view the instance of sensitive content; and training the machine learning model so that a next time that the sensitive content is shared with the respective user the machine learning model will determine whether the respective user is authorized to view the instance of the sensitive content based in part on the respective user being previously authorized to view the sensitive content.

Clause 3. The machine-implemented method of Clause 1 or Clause 2, wherein determining whether the respective user is authorized to view the instance of sensitive content comprises: determining, by the machine learning model, based on the training of the machine learning model, whether the respective user is authorized to view sensitive content based on a plurality of signals, a first signal comprising identifying whether the respective user previously viewed the instance of sensitive content and a second signal comprising identifying the one or more associations between the instance of sensitive content and the user profile of the respective user.

Clause 4. The machine-implemented method of Clause 3, wherein a third signal of the plurality of signals comprises: identifying a semantic association between a name of a group that the respective user is associated with and access to a classification of the sensitive content.

Clause 5. The machine-implemented method of Clause 3, wherein a fourth signal of the plurality of signals comprises: identifying peers of the respective user that have access to the instance of sensitive content.

Clause 6. The machine-implemented method of any one of Clauses 3-5, further comprising: classifying the sensitive content using a machine learning model to generate a content classification; classifying the user profiles using the machine learning model to generate profile classifications; generating embeddings for the content classification and the profile classification using a language model, wherein the embeddings represent a semantic meaning of the content classification and profile classifications; and determining a semantic similarity between the content classification and a profile classification of the user profile of the respective user by comparing the embeddings; wherein the plurality of signals comprises associating the instance of sensitive content with the user profile of the respective user based on the determined semantic similarity.

Clause 7. The machine-implemented method of Clause 6, wherein associating the instance of sensitive content with the user profile of the respective user based on the determined semantic similarity comprises identifying that a department, title or position associated with the respective user is associated with access to certain classifications of the sensitive content.

Clause 8. The machine-implemented method of any one of Clauses 3-7, wherein the plurality of signals includes identifying that the instance of sensitive content was authorized to be viewed by other users in a same group with the respective user within a predetermined window of time.

Clause 9. The machine-implemented method of any one of Clauses 1-8, wherein receiving the indication that the sensitive content was shared with the respective user comprises: providing the machine learning model with a piece of content currently being shared between the users; and receiving, from the machine learning model based on the providing, an indication that a first user is sharing the instance of sensitive content with the respective user.

Clause 10. The machine-implemented method of any one of Clauses 1-9, wherein the machine learning model comprises a large language model configured for language processing.

Clause 11. The machine-implemented method of Clause 10, wherein receiving the indication that the sensitive content was shared with the respective user comprises: identifying a document shared between two or more of the users; and passing the document to the large language model to identify the sensitive content and to determine whether the respective user is authorized to view the sensitive content.

Clause 12. The machine-implemented method of any one of Clauses 1-11, wherein determining whether the respective user is authorized to view the instance of the sensitive content based on the respective user being previously authorized to view the sensitive content, comprises assigning greater weight to the respective user being previously authorized to view the sensitive content commensurate with how many times the respective user was previously confirmed to be authorized to view the instance of sensitive content.

Clause 13. The machine-implemented method of any one of Clauses 1-12, wherein allowing the instance of sensitive content to be shared with the respective user comprises overriding or bypassing an action performed by a data loss protection system with regard to the sharing of the instance of sensitive content, and wherein preventing the instance of sensitive content to be shared with the respective user comprises allowing the data loss protection system to perform normal operations with regard to the sharing of the instance of sensitive content.

Clause 14. A system, comprising: a server comprising: one or more processors; and a non-transitory memory storing instructions that, when executed by the one or more processors, causes the one or more processors to facilitate performance of the machine-implemented method of any one of Clauses 1-13.

Clause 15. A non-transitory machine readable medium storing instructions thereon that, when executed by a machine, causes the machine to perform the machine-implemented method of any one of Clauses 1-13.

FURTHER CONSIDERATIONS

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention described herein.

The term website, as used herein, may include any aspect of a website, including one or more web pages, one or more servers used to host or store web related content, etc. Accordingly, the term website may be used interchangeably with the terms web page and server. The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "implementation" does not imply that such implementation is essential to the subject technology or that such implementation applies to all configurations of the subject technology. A disclosure relating to an implementation may apply to all implementations, or one or more implementations. An implementation may provide one or more examples. A phrase such as an "implementation" may refer to one or more implementations and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

What is claimed is:

1. A machine-implemented method of protection data in a data collaboration environment, comprising:

training a machine learning model to classify sensitive content and user profiles of users accessing a computer network, and to determine whether users are authorized to view instances of the sensitive content based on identifying associations between the sensitive content and the user profiles;

receiving an indication that an instance of sensitive content was shared with a respective user;

responsive to the indication that the instance the sensitive content was shared with the respective user:

determining, by the machine learning model, whether the respective user is authorized to view the instance of sensitive content based on the training of the machine learning model and the machine learning model identifying one ore more associations between the instance of sensitive content and the user profile of the respective user;

only when the machine learning model determines that the respective user is authorized to view the sensitive content, allowing the instance of sensitive content to be shared with the respective user, automatically without further user intervention; and when the machine learning model determines that the respective user was not authorized to view the instance of sensitive content, preventing the instance of sensitive content to be shared with the respective user.

2. The machine-implemented method of claim 1, wherein the method further comprises, after allowing the instance of sensitive content to be shared with the respective user:

flagging the respective user for future authorization to the instance of sensitive content;

receiving a confirmation that the respective user should be authorized to view the instance of sensitive content; and training the machine learning model so that a next time that the sensitive content is shared with the respective user the machine learning model will determine whether the respective user is authorized to view the instance of the sensitive content based in part on the respective user being previously authorized to view the sensitive content.

3. The machine-implemented method of claim 1, wherein determining whether the respective user is authorized to view the instance of sensitive content comprises:

determining, by the machine learning model, based on the training of the machine learning model, whether the respective user is authorized to view sensitive content based on a plurality of signals, a first signal comprising identifying whether the respective user previously viewed the instance of sensitive content within a pre-determined window of time, and a second signal comprising identifying the one or more associations between the instance of sensitive content and the user profile of the respective user.

4. The machine-implemented method of claim 3, wherein a third signal of the plurality of signals comprises:

identifying a semantic association between a name of a group that the respective user is associated with and access to a classification of the sensitive content.

5. The machine-implemented method of claim 3, wherein a fourth signal of the plurality of signals comprises:

identifying peers of the respective user that have access to the instance of sensitive content.

6. The machine-implemented method of claim 3, further comprising:

classifying the sensitive content using a machine learning model to generate a content classification;

classifying the user profiles using the machine learning model to generate profile classifications;

generating embeddings for the content classification and the profile classification using a language model, wherein the embeddings represent a semantic meaning of the content classification and profile classifications; and determining a semantic similarity between the content classification and a profile classification of the user profile of the respective user by comparing the embeddings;

wherein the plurality of signals comprises associating the instance of sensitive content with the user profile of the respective user based on the determined semantic similarity.

7. The machine-implemented method of claim 6, wherein associating the instance of sensitive content with the user profile of the respective user based on the determined semantic similarity comprises identifying that a department, title or position associated with the respective user is associated with access to certain classifications of the sensitive content.

8. The machine-implemented method of claim 3, wherein the plurality of signals includes identifying that the instance of sensitive content was authorized to be viewed by other users in a same group with the respective user within a predetermined window of time.

9. The machine-implemented method of claim 1, wherein receiving the indication that the sensitive content was shared with the respective user comprises:

providing the machine learning model with a piece of content currently being shared between the users; and receiving, from the machine learning model based on the providing, an indication that a first user is sharing the instance of sensitive content with the respective user.

10. The machine-implemented method of claim 1, wherein the machine learning model comprises a large language model configured for language processing.

11. The machine-implemented method of claim 10, wherein receiving the indication that the sensitive content was shared with the respective user comprises:

identifying a document shared between two or more of the users; and passing the document to the large language model to identify the sensitive content and to determine whether the respective user is authorized to view the sensitive content.

12. The machine-implemented method of claim 1, wherein determining whether the respective user is authorized to view the instance of the sensitive content based on the respective user being previously authorized to view the sensitive content, comprises assigning greater weight to the respective user being previously authorized to view the sensitive content commensurate with how many times the respective user was previously confirmed to be authorized to view the instance of sensitive content.

13. The machine-implemented method of claim 1, wherein allowing the instance of sensitive content to be shared with the respective user comprises overriding or bypassing an action performed by a data loss protection system with regard to the sharing of the instance of sensitive content, and wherein preventing the instance of sensitive content to be shared with the respective user comprises allowing the data loss protection system to perform normal operations with regard to the sharing of the instance of sensitive content.

14. A system, comprising:

a server comprising:

one or more processors; and a non-transitory memory storing instructions that, when executed by the one or more processors, causes the one or more processors to facilitate performance of the machine-implemented method of claim 1.

15. A non-transitory machine readable medium storing instructions thereon that, when executed by a machine, causes the machine to perform the machine-implemented method of claim 1.

* * * * *